United States Patent
Herreyre et al.

(10) Patent No.: US 6,399,255 B2
(45) Date of Patent: *Jun. 4, 2002

(54) RECHARGEABLE LITHIUM ELECTROCHEMICAL CELL USABLE AT LOW TEMPERATURE

(75) Inventors: Sylvie Herreyre; Philippe Biensan, both of Epinay sur Orge; Françoise Perton, Beruges; Sylvie Barusseau, Bretigny sur Orge, all of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,699

(22) Filed: Dec. 29, 1998

(30) Foreign Application Priority Data

Dec. 10, 1998 (FR) .......................................... 98 15576

(51) Int. Cl.⁷ ............................................... H01M 6/16
(52) U.S. Cl. ........................ 429/331; 429/326; 429/330; 429/332; 429/334
(58) Field of Search ................................. 429/326, 330, 429/331, 334, 332

(56) References Cited

U.S. PATENT DOCUMENTS

| | | | |
|---|---|---|---|
| 5,385,794 A | * | 1/1995 | Yokoyama et al. |
| 5,474,862 A | * | 12/1995 | Okuno et al. |
| 5,484,669 A | * | 1/1996 | Okuno et al. |
| 5,665,491 A | * | 9/1997 | Tomiyama et al. |
| 5,686,203 A | * | 11/1997 | Idota et al. |
| 5,714,281 A | | 2/1998 | Naruse et al. |
| 5,866,279 A | * | 2/1999 | Wada et al. ................. 429/224 |

FOREIGN PATENT DOCUMENTS

| EP | 0 482 287 A1 | 4/1992 |
|---|---|---|
| EP | 0 548 449 A1 | 6/1993 |
| EP | 0 573 266 A1 | 12/1993 |
| EP | 0 582 410 A1 | 2/1994 |
| EP | 0 688 057 A1 | 12/1995 |
| GB | 2 306 761 A | 5/1997 |
| WO | WO 98/28806 | 7/1998 |

OTHER PUBLICATIONS

Patent Abstracts of Japan, S. Toshihiko, Sanyo Electric Co. Ltd., Pub. date Jun. 6, 1997, Pub. No. 09147910.
Patent Abstracts of Japan, F. Sanehiro, Sanyo electric Co. Ltd., Pub. date Mar. 27, 1992, Pub. No. 04095362.
Patent Abstracts of Japan, M. Sukeyuki, Matsushita Elec. Ind. Co. Ltd., Pub. date Sep. 10, 1992, Pub. No. 04255670.
IECEC–97, M. Smart, et al., "Dev. of Advanced Lithium–ion rechargeable cells . . .", XP002113245 1997 (No month).
Mitsui Chem Inc., May 29, 1998, "Non–aqueous electrolytic solution—formed . . .", XP002135025.
Patent Abstract Of Japan, vol. 018, No. 277 (E–1554), May 26, 1994 corresponding to JP 06 052886 A (Matsushita Electric Ind Co Ltd) Feb. 25, 1994.
Patent Abstracts Of Japan, vol. 097, No. 005, May 30, 1997, corresponding to JP 09 022738 A (Hitachi Maxell Ltd) dated Jan. 21, 1997.
Patent Abstracts of Japan, vol. 097, No. 011, Nov. 28, 1997 corresponding to JP 09 199135 A (Nippon Zeon Co Ltd) dated Jul. 31, 1997.
Patent Abstracts Of Japan, vol. 017, No. 249 (E–1366), May 18, 1993 corresponding to JP 04 370661 A (Toshiba Battery Co Ltd) dated Dec. 24, 1992.
Patent Abstracts Of Japan, vol. 017, No. 668, (E–1473) Dec. 9, 1993 corresponding to JP 05 225982 A (Toshiba Battery Co Ltd) dated Sep. 3, 1993.

* cited by examiner

*Primary Examiner*—Carol Chaney
*Assistant Examiner*—Tracy Dove
(74) *Attorney, Agent, or Firm*—Sughrue Mion, PLLC

(57) ABSTRACT

The present invention provides a rechargeable lithium electrochemical cell comprising an electrolyte containing a lithium salt dissolved in a non-aqueous solvent, at least one positive electrode, and at least one negative electrode of the paste type containing an electrochemically active material which is a carbon compound suitable for inserting lithium ions and a binder, the cell being characterized in that said solvent contains at least one saturated cyclic carbonate and at least one linear ester of a saturated aliphatic monocarboxylic acid, and in that said binder is a polymer having no fluorine.

36 Claims, No Drawings

RECHARGEABLE LITHIUM ELECTROCHEMICAL CELL USABLE AT LOW TEMPERATURE

The present invention relates to a rechargeable lithium electrochemical cell that is usable at low temperature.

A lithium electrochemical cell possesses an electrochemical stack including a positive electrode comprising electrochemically active material capable of inserting lithium into its structure (generally an oxide of a transition metal, usually lithiated), and a negative electrode that supplies the lithium ions. The electrodes are placed on either side of a separator membrane that is generally made of polyolefin. The electrochemical stack is impregnated in a non-aqueous electrolyte that is solid or liquid. The electrolyte contains a lithium salt dissolved in a mixture of organic solvents.

The low temperature operation of such cells has frequently been investigated. Attention has been given mainly to the composition of the electrolyte.

According to document JP-08 195 221, low temperature (−20° C.) conductivity is increased when the solvent is made up of ethylene carbonate, propylene carbonate, an acetic ester, and at least one compound selected from diethyl or dimethyl carbonate, and dimethoxyethane. The volume fraction of the acetic ester is not more than 50%.

A rechargeable lithium electrochemical cell including an anode of metallic lithium or of lithium alloy, and a cathode whose active material is an electrically-conductive organic polymer, is described in document FR-2 641 130. The electrolyte is a lithium salt dissolved in a solvent, which salt is a combination of a cyclic carbonate and a non-cyclic carbonate. That cell retains sufficient discharge capacity at a temperature of less than 0° C.

U.S. Pat. No. 4,056,663 describes a rechargeable electrochemical cell having a metallic lithium anode and a metal oxide cathode, in which the electrolyte comprises a solvent that does not contain ether. The solvent is a mixture of carbonates or a mixture of at least one carbonate and at least one ester.

According to U.S. Pat. No. 4,983,476, improved low temperature performance is obtained by replacing the metallic lithium of the anode with a transition metal sulfide. The electrolyte comprises an aprotic organic solvent such as methyl formate, propylene carbonate, dimethyl carbonate, diethyl carbonate, dimethoxyethane, tetrahydrofuran, and mixtures thereof.

The most recent rechargeable lithium electrochemical cells possess a negative electrode of the paste type having a conductive support that acts as a current collector on which there is placed a paste containing a binder and an electrochemically active material which is a material that is capable of inserting lithium into its structure. The greater safety of such cells makes them suitable for a wider range of applications. For use in particular in an electric vehicle or in radiocommunications, such cells must be capable of operating at low temperature, and in particular at below −20° C.

To this end, document EP-0 482 287 suggests using a rechargeable lithium electrochemical cell possessing a compressed anode containing carbon, a cathode comprising a lithiated oxide, and an electrolyte including a lithium salt dissolved in an organic solvent comprising a cyclic ester and a linear ester.

A rechargeable electrochemical cell having a carbon anode as described in document JP-09 022 738 contains an electrolyte whose solvent comprises a cyclic carbonate, a linear carbonate, and up to 44% by volume ethyl acetate. The binder of the electrodes is polyvinylidene fluoride, and the active material of the cathode is a lithium cobalt oxide. That cell has improved performance at low temperature. The document mentions a drop in performance at low temperature when methyl propionate or ethyl propionate is used as the solvent.

The discharged capacity of a rechargeable lithium electrochemical cell in accordance with document EP-0-531 617 can be increased. The cell comprises a carbon anode and a lithiated oxide cathode. The electrolyte solvent is a mixture of a cyclic carbonate, a linear carbonate, and a compound of formula RCOOR1, where R is an ethyl radical and R1 is an alkyl group having 1 to 3 carbon atoms. The respective volume fractions thereof are preferably 20% to 50%, 10% to 70%, and 10% to 70%.

Document EP-0 614 240 describes a rechargeable lithium electro-chemical cell having a carbon anode and a metal oxide cathode, with improved discharge at a high discharge rate, particularly at low temperature. The cell contains an electrolyte comprising a lithium salt and a mixture of aprotic solvents made up by volume of 10% to 20% ethylene carbonate, 5% to 40% propylene carbonate, and 50% to 85% dimethyl carbonate.

To improve high-rate discharge at low temperature, document EP-0 766 332 proposes an electrochemical cell comprising paste electrodes in which the binder is polyvinylidene fluoride (PVDF). It has an anode comprising an electrochemically active material based on carbon, and a cobalt oxide cathode. The solvent of the electrolyte is, by volume, made up of 50% to 60% of a mixture of cyclic carbonate and of cyclic ester, such as γ-butyrolactone or γ-valerolactone, 20% to 40% of a linear carbonate, and 10% to 25% of a linear ester.

Self-discharge during storage at low temperature is decreased in a rechargeable lithium electrochemical cell having a carbon anode, and a lithiated oxide cathode, in accordance with EP-0 548 449. The electrolyte solvent is a mixture of three components which are an aliphatic carboxylate, a cyclic carbonate, and a linear carbonate. The respective volume proportions thereof are preferably 10% to 80%, 20% to 50%, and not more than 70%.

An object of the present invention is to provide a rechargeable lithium electrochemical cell having a carbon anode in which performance during low temperature operation is better than that of known cells.

The present invention provides a rechargeable lithium electrochemical cell comprising an electrolyte containing a lithium salt dissolved in a non-aqueous solvent, at least one positive electrode, and at least one negative electrode of the paste type containing an electrochemically active material which is a carbon compound suitable for inserting lithium ions and a binder. The invention is characterized in that said solvent contains at least one saturated cyclic carbonate and at least one linear ester of a saturated aliphatic monocarboxylic acid, and in that said binder is a polymer having no fluorine.

The terms "linear ester of a saturated aliphatic monocarboxylic acid" and "saturated aliphatic carboxylate" are used to mean a compound of formula RC—O—OR' in which R is H or an alkyl group, and R' is an alkyl group such as $CH_3$ (methyl), $CH_3$—$CH_2$ (ethyl), etc. . . . Said linear ester of a saturated aliphatic monocarboxylic acid is, for example, a formiate if R is H, an acetate if R is $CH_3$, a propionate if R is $CH_3$—$CH_2$, a butyrate if R is $CH_3$—$(CH_2)_2$, a valeriate if R is $CH_3$—$(CH_2)_3$, etc. . . . .

In the solvent, the volume proportion of said saturated cyclic carbonate lies in the range 5% to 60% of said solvent, and the volume proportion of said linear ester lies in the range 20% to 85% of said solvent, the proportion of said linear ester is preferably not less than 50% of said solvent.

Said saturated cyclic carbonate is selected from propylene carbonate, ethylene carbonate, butylene carbonate, and mixtures thereof.

In a first variant, said saturated cyclic carbonate is ethylene carbonate.

In a second variant, said saturated cyclic carbonate is propylene carbonate.

In a third variant, said saturated cyclic carbonate is a mixture of ethylene carbonate and of propylene carbonate.

Said linear ester is selected from an acetate, a butyrate, a propionate, and mixtures thereof. By way of example, it is possible to select an ethyl acetate, a methyl acetate, a propyl acetate, an ethyl butyrate, a methyl butyrate, a propyle butyrate, an ethyl propionate, a methyl propionate, a propyl propionate.

In a first variant, said linear ester is ethyl acetate.

In a second variant, said linear ester is methyl butyrate.

In another implementation of the invention, said solvent further comprises a saturated linear carbonate.

Said linear ester is selected form an acetate, a butyrate, a propionate, and mixtures thereof. By way of example, it is possible to select an ethyl acetate, a methyl acetate, a propyl acetate, an ethyl butyrate, a methyl butyrate, a propyl butyrate, an ethyl propionate, a methyl propionate, a propyl priopionate.

The volume proportion of said linear carbonate is not more than 40% of said solvent. When the solvent contains any, the volume proportion of said linear carbonate preferably lies in the range 5% to 40% of said solvent.

In another embodiment of the invention, said solvent further comprises an unsaturated cyclic carbonate.

Said unsaturated cyclic carbonate is selected from vinylene carbonate and derivatives thereof, in particular propylidene carbonate, ethylidene ethylene carbonate, isopropylidene ethylene carbonate. Said unsaturated linear carbonate is preferably vinylene carbonate.

The term "derivatives of vinylene carbonate" is used to cover compounds possessing at least one unsaturated bond connected to a carbon atom of the cycle, for example propylidene carbonate, ethylidene ethylene carbonate (or 4-ethylidene 1-3 dioxolane 2 one), or isopropylidene ethylene carbonate (or 4-isopropylidene 1-3 dioxolane 2 one).

The volume proportion of said unsaturated cyclic carbonate is no more than 60% of said solvent. When the solvent contains any, the volume proportion of said unsaturated cyclic carbonate preferably lies in the range 0.5% to 10% of said solvent.

In a first embodiment of the invention, said binder contains an elastomer.

Preferably, said elastomer is selected from a copolymer of acrylonitrile and of butadiene, and a copolymer of styrene and of butadiene.

The proportion by weight of said elastomer lies in the range 30% to 70% of said binder.

In a second embodiment of the invention, said binder contains a cellulose compound.

Preferably, said cellulose compound is a carboxymethyl cellulose having a mean molecular weight greater than about 200,000.

The proportion by weight of said cellulose compound lies in the range 30% to 70% of said binder.

In a third embodiment of the invention, said binder is made up of a mixture of an elastomer and of a cellulose compound.

In a first variant, said binder is made up of a mixture of a copolymer of acrylonitrile and of butadiene, and of carboxymethyl cellulose having a mean molecular weight of greater than about 200,000.

In a second variant, said binder is made up of a mixture of a copolymer of styrene and of butadiene and carboxymethyl cellulose having a mean molecular weight greater than about 200,000.

In the binder, the proportion by weight of said elastomer lies in the range 30% to 70% of said binder and the proportion by weight of said cellulose compound lies in the range 30% to 70% of said binder.

The proportion by weight of said elastomer preferably lies in the range 50% to 70% of said binder and the proportion by weight of said cellulose compound preferably lies in the range 30% to 50% of said binder.

In a fourth embodiment of the invention, said binder contains an acrylic polymer.

Said polymer is preferably a homopolymer of acrylic acid.

The proportion by weight of said acrylic polymer lies in the range 20% to 60% of said binder.

In a fifth embodiment of the invention, said binder is made up of a mixture of an elastomer and of an acrylic polymer.

In a first variant, said binder is made up of a mixture of a copolymer of acrylonitrile and of butadiene, and a homopolymer of acrylic acid.

In a second variant, said binder is made up of a mixture of a copolymer of styrene and of butadiene, and of a homopolymer of acrylic acid.

In the binder, the proportion by weight of said elastomer lies in the range 40% to 80% of said binder and the proportion by weight of said acrylic polymer lies in the range 20% to 60% of said binder.

The cell of the invention has a paste negative electrode comprising a conductive support and an active layer containing the active material and the binder.

The conductive support can be a two-dimensional support, such as a solid or perforated foil, an expanded metal, a grid, or a cloth, or it can be a three-dimensional support such as a felt or a foam having fibers that are metallic, metal-plated, or made of carbon.

The active material is a material suitable for inserting lithium ions at low potential (i.e. not exceeding 1.5 V). The material is preferably selected from carbon in crystal form, such as graphite powder or fibers, graphitizable carbon compounds of low crystal content, such as coke, nongraphitizable carbon compounds of low crystal content, such as vitreous carbon and carbon black, and mixtures thereof.

The cell of the invention has a positive electrode whose active material is a material suitable for inserting lithium ions at high potential (i.e. not less than 2.5 V). This material is preferably selected from a lithiated oxide of a transition metal, such as nickel, cobalt, manganese, vanadium, and iron, a sulfide, a sulfate, and mixtures thereof.

The cell of the invention contains a liquid or solid electrolyte containing a lithium salt. The lithium salt is preferably selected from lithium perchlorate $LiClO_4$, lithium hexafluoroarsenate $LiAsF_6$, lithium hexafluorophoshate $LiPF_6$, lithium tetrafluoroborate $LiBF_4$, lithium trifluoromethanesulfonate $LiCF_3SO_3$, lithium trifluoromethanesulfonimide $LiN(CF_3SO_2)_2$ (LiTFSI), or lithium trifluoromethanesulfonemethide $LiC(CF_3SO_2)_3$ (LiTFSM).

The present invention also provides the use of a cell of the invention at very low temperatures, i.e. temperatures less than or equal to −20° C.

Other characteristics and advantages of the present invention appear from the following examples, naturally given as non-limiting illustrations.

EXAMPLE 1

Non-aqueous electrolytes were prepared, constituted by lithium hexafluorophosphate $LiPF_6$ at a concentration of 1 M dissolved in organic solvents that were mixtures of solvents selected from ethylene carbonate EC, propylene carbonate PC, dimethyl carbonate DMC, diethyl carbonate DEC, methyl and ethyl carbonate EMC, ethyl acetate EA, methyl acetate MA, methyl butyrate MB, ethyl propionate EP, and methyl propionate MP.

The viscosities of the electrolytes were measured as a function of temperature.

The results are given in Table 1 below. Viscosity is given in $mm^2/sec$.

TABLE 1

| | Viscosity | | | |
|---|---|---|---|---|
| Electrolyte | −40° C. | −20° C. | ° C. | +20° C. |
| EC/PC/DMC 20/20/60 | solid | | 4.0 | 2.4 |
| EC/PC/EMC 20/20/60 | 35 | 11 | 5.3 | 3.2 |
| EC/DMC/EMC 25/15/60 | 16 | 6.8 | 3.4 | 2.1 |
| EC/EA 50/50 | 17 | 6.0 | 3.6 | 2.5 |
| EC/PC/EA 15/25/60 | 12 | 5.4 | 3.2 | 2.1 |
| EC/PC/MA 15/25/60 | 7.4 | 3.7 | 2.3 | 1.6 |
| EC/PC/MP 15/20/65 | 9.6 | 4.6 | 2.8 | 1.9 |
| EC/DMC/MP 15/35/50 | 7.4 | 3.8 | 2.3 | 1.6 |

At lower temperatures, the lowest viscosities were given by electrolytes containing a methyl acetate or propionate (the EC/PC/MA and EC/DMC/MP mixtures). As for the EC/PC/DMC mixture which does not contain a linear ester of a monocarboxylic acid, it was solid at that temperature.

Measurements of conductivity as a function of temperature were performed for the above-prepared electrolytes. The results are given in Table 2 below. Conductivity is expressed in mS/cm.

TABLE 2

| | Conductivity | | | | | |
|---|---|---|---|---|---|---|
| Electrolyte | −40° C. | −30° C. | −20° C. | −10° C. | 0° C. | +20° C. |
| EC/PC/DMC 20/20/60 | solid | solid | 4.2 | 4.8 | 7.5 | 11 |
| EC/PC/DEC 20/20/60 | solid | 1.2 | 1.9 | 2.8 | 3.9 | 6.4 |
| EC/PC/EMC 20/20/60 | 1 | 1.5 | 2.3 | 3.5 | 4.8 | 7.8 |
| EC/DMC/EMC 25/15/60 | 1.4 | 2.0 | 3.2 | 4.0 | 5.3 | 7.6 |
| EC/EA 50/50 | 1.1 | 3.2 | 5.3 | 7.1 | 9.1 | 13 |
| EC/PC/EA 20/20/60 | 2.3 | 2.7 | 4.9 | 5.5 | 7.3 | 11.2 |
| EC/DMC/EA 15/25/60 | 4 | 5.6 | 7.1 | 8.6 | 10.2 | 13.3 |
| EC/PC/MA 20/20/60 | 3.2 | 5.3 | 7.4 | 9.6 | 12 | 16.6 |
| EC/PC/MB 20/20/60 | 1.6 | 2.3 | 3.4 | 5.0 | 6.5 | 9.9 |
| EC/PC/MB/VC 19/19/57/5 | 1.6 | 2.3 | 3.5 | 4.9 | 6.3 | 9.5 |
| EC/PC/EP 20/20/60 | 2.0 | 2.5 | 3.6 | 4.8 | 6.5 | 9.6 |
| EC/PC/MP 20/20/60 | 2.3 | 3.4 | 4.3 | 5.7 | 7.2 | 10.4 |
| EC/DMC/MP 15/32/20 | 3.5 | 4.7 | 6.2 | 7.7 | 9.0 | 11.7 |

Only the following mixtures EC/PC/EA, EC/DMC/EA, EC/PC/MA, EC/PC/EP, EC/PC/MP, and EC/DMC/MP still had conductivity greater than 2 milliSiemens/cm at a temperature of −40° C.

EXAMPLE 2

A rechargeable lithium electrochemical cell was prepared in 4/5A format, having a nickel positive electrode, a carbon negative electrode, a separator, and a non-aqueous electrolyte.

The positive electrode was of the paste type on an aluminum foil. The paste contained the electrochemically active material which was a substituted lithium nickel oxide $LiNiMO_2$ (where M is at least one doping element), a binder which was polyvinylidene fluoride (PVDF), and a carbon-based conductive material.

The negative electrode was of the paste type on a copper foil. The paste contained 85% by weight of electrochemically active material constituted by a mixture of graphitized carbon compounds and/or graphites, and 15% by weight of a binder which was polyvinylidene fluoride (PVDF).

A microporous polyolefin separator was placed between the electrodes to form an electrochemical stack. The stack was spiral-wound and a spool was obtained which was inserted into a metal can. The electrochemical stack was impregnated with one of the above-described electrolytes.

EXAMPLE 3

A rechargeable lithium electrochemical cell analogous to the cell of Example 2 was prepared except that it had a carbon negative electrode of the type comprising paste on a copper foil. The paste contained 96% by weight of electrochemically active material constituted by a mixture of graphitized carbon compounds and/or of graphites, and 4% by weight of a binder constituted by an equal-weight mixture of a copolymer of acrylonitrile and of butadiene (2% by weight of NBR) and of carboxymethyl cellulose (2% by weight of CMC) having a mean molecular weight of not less than 200,000.

EXAMPLE 4

A rechargeable lithium electrochemical cell was prepared analogous to the cell in Example 3, with the exception that the binder of the negative electrode was an equal-weight mixture of a copolymer of styrene and of butadiene (2% by weight of SBR) and of carboxymethyl cellulose (2% by weight of CMC) having a mean molecular weight of not less than 200,000.

The cells of Examples 2 to 4 were evaluated electrochemically by means of the following tests.

Cycling test at ambient temperature (25° C.) and at high discharge rates:

A first cycle was performed at a normal rate in order to determine the characteristics of the cells:
- initial charging at a rate of 0.5 $I_c$ (where $I_c$ is the current required for discharging the nominal capacity $C_n$ of said cell in one hour) for a period of 3 hours; and
- an initial discharge at 0.2 $I_c$ down to a voltage of 2.7 volts.

The initially discharged capacity $C_i$ was measured in milliAmpere-hours per gram of positive active material during the initial discharge at normal rates at 25° C.

Thereafter the following cycling was performed at a high discharge rate:
- charging at a rate of 0.5 $I_c$ for 3 hours; and
- discharging at $I_c$ down to 2.7 V.

The capacities discharged during the discharges of cycles 50 and 200 were measured. These measurements make it possible to determined the loss of capacity $F_{50}$ and $F_{200}$ in % per cycle, respectively after 50 cycles and after 200 cycles.

Storage test:

An initial test was performed in order to measure the initially discharged capacity $C_i$ in mAh/g of the positive active material:
- charging at 0.5 $I_c$ for 3 hours; and
- discharging at 0.2 $I_c$ down to 2.7 V.

Then the following succession of operations was performed four times over prior to taking measurements:
- charging at a rate of $I_c$ for 3 hours;
- storing for 8 days at 40° 0C.; and
- discharging at 0.2 $I_c$ down to 2.7 V.

The loss of capacity S expressed in % of $C_i$ was measured during the discharge following the fourth period of storage.

The results of the above tests are given in Table 3 below.

TABLE 3

| Electrolyte | Binder | $C_i$ | $F_{50}$ | $F_{200}$ | S |
|---|---|---|---|---|---|
| EC/PC/DMC 20/20/60 | PVDF | 139 | 0.3 | 01.2 | 10.9 |
| EC/EA 50/50 | PVDF | 149 | 0.45 | 0.31 | 25 |
| EC/PC/EA 15/25/60 | PVDF | 150 | 1 | 0.36 | 30.8 |
| EC/DMC/EA 15/25/60 | PVDF | 137 |  |  | 15.4 |
| EC/PC/DMC/VC 19/19/57/5 | NBR + CMC | 144 | 0.10 | 0.03 | 1 |
| EC/DMC/EA/VC 14/24/57/5 | NBR + CMC | 144 | 0.09 | 0.03 | 1 |
| EC/DMC/EA/VC 14/24/57/5 | SBR + CMC | 145 | 0.10 |  |  |

When the binder of the negative electrode was PVDF, the cells whose electrolyte solvent contained EA presented losses of capacity in cycling at ambient temperature and in storage that were greater than those for cells in which the electrolyte contained no EA.

At ambient temperature, cells containing EA and having a negative electrode binder made up of elastomer+CMC in accordance with the invention presented initial capacity, and stability during cycling and storage that were considerably better than those of prior art cells in which the negative binder was PVDF.

Cycling test at low temperature:

This test was performed as follows:
- charging at a rate of 0.5 $I_c$ for 3 hours; and
- discharging at 0.2 $I_c$, 0.5 $I_c$, $I_c$ or 2 $I_c$ down to a voltage of 2 volts.

The initially discharged capacity $C_i$ in mAh/g during the first discharge was measured. Thereafter the discharged capacities $C_{-20° C.}$ and $C_{-30° C.}$ were measured respectively at −20° C. and at −30° C., being expressed in % of $C_i$ at ambient temperature, for the various discharge rates.

The results are given in Table 4 below.

TABLE 4

| Electrolyte | Binder | $C_i$ | $C_{-20°C}$ (% $C_i$) | | | | $C_{-30°C}$ (% $C_i$) | | | |
|---|---|---|---|---|---|---|---|---|---|---|
| | | | $0.21_C$ | $0.51_C$ | $I_C$ | $21_C$ | $0.21_C$ | $0.51_C$ | $I_C$ | $21_C$ |
| EC/PC/DMC/VC 19/19/57/5 | PVDF | 140 | 64 |  | 18 | 0 | 20 |  | 0 | 0 |
| EC/PC/EA 15/25/60 | PVDF | 142 | 42 |  | 24 | 2 | 29 |  | 2 | 0 |
| EC/DMC/EA 15/25/60 | PVDF | 145 | 49 |  | 28 | 10 | 57 |  | 18 | 0 |
| EC/PC/DMC/VC 19/19/57/5 | NBR/ CMC | 145 |  | 71 | 46 | 10 |  | 38 | 0 | 0 |
| EC/DMC/EA/VC 14/24/57/5 | NBR CMC | 144 |  | 75 | 77 | 62 |  | 57 | 71 | 47 |
| EC/DMC/EA/VC 14/24/57/5 | SBR CMC | 145 |  |  |  |  |  | 58 | 68 |  |

When the binder of the negative electrode was PVDF, the cells whose electrolyte contained EA had a higher discharged capacity at low temperature, particularly at a high discharge rate, than did the cells which did not contain any EA. Under difficult conditions (−30° C., $I_c$), the discharged capacity was 18% in the best of cases.

When the binder of the negative electrode was a mixture of elastomer+CMC, it can be seen that the results were of the same order of magnitude as before when the cell had an electrolyte which did not contain acetate.

Surprisingly, when an electrode containing a negative binder of elastomer+CMC is associated with an electrolyte containing ethyl acetate in a cell of the invention, very much better results are obtained. Under the most extreme conditions (−30° C., $2I_c$), nearly half the capacity of that cell was still usable.

EXAMPLE 4

A rechargeable lithium electrochemical cell was prepared analogous to the cell of Example 2 except that the electrochemically active material of the positive electrode was a lithium cobalt oxide $LiCoO_2$.

The cell was evaluated electrochemically using the tests described above.

For the cycling test at ambient temperature (25° C.) at a high discharge rate, and for the storage test, the results are given in Table 5 below.

TABLE 5

| Electrolyte | Binder | $C_i$ | $F_{50}$ | $F_{200}$ | S |
|---|---|---|---|---|---|
| EC/DMC/DEC/VC 38/38/19/5 | NBR + CMC | 128 | 0.04 | 0.03 | 10 |
| EC/DMC/EA/VC 14/24/57/5 | NBR + CMC | 129 | 0.05 | 0.05 | 10 |
| EC/PC/MB/VC 19/19/57/5 | NBR + CMC | 128 | 0.05 | 0.05 | 7 |

It can be seen that the cycling performance at ambient temperature and the storage performance were of the same order for all of the cells tested.

The results of the low temperature cycling test are given in Table 6 below.

TABLE 6

| | | | $C_{-20°C.}$ | $C_{-30°C}$ | | $C_{-30°C}$ | |
|---|---|---|---|---|---|---|---|
| Electrolyte | Binder | $C_i$ | $0.21_C$ | $0.21_C$ | $I_C$ | $0.21_C$ | $I_C$ |
| EC/DMC/DEC/VC 38/38/19/5 | NBR + CMC | 129 | 86 | 0 | 0 | 0 | 0 |
| EC/DMC/EA/VC 14/24/57/5 | NBR + CMC | 129 | 100 | 94 | 99.7 | 76 | 0 |
| EC/PC/MB/VC 19/19/57/5 | NBR + CMC | 128 | 100 | 94 | 99 | 77 | 0 |

Cells with electrolytes containing EA or MB gave better results from −20° C., than cells whose electrolytes did not contain any; at −40° C. they still gave more than three-fourths of their initial ambient temperature capacity.

What is claimed is:

1. A rechargeable lithium electrochemical cell comprising
   an electrolyte containing a lithium salt dissolved in a non-aqueous solvent, wherein the solvent is essentially constituted of (A) at least one linear ester of a saturated aliphatic monocarboxylic acid and (B) at least two cyclic carbonates, one of which is a saturated cyclic carbonate and one of which is an unsaturated cyclic carbonate,
   at least one positive electrode,
   at least one negative pasted electrode containing a carbon compound electrochemically active material suitable for inserting lithium ions and a polymer binder containing no fluorine;
   wherein said linear ester is not less than 50% by volume of said solvent.

2. The cell according to claim 1, wherein said saturated cyclic carbonate is 5% to less than 50% by volume of said solvent.

3. The cell according to claim 1
   in which said saturated cyclic carbonate is selected from the group consisting of propylene carbonate, ethylene carbonate, butylene carbonate, and mixtures thereof.

4. The cell according to claim 3, in which said saturated cyclic carbonate is ethylene carbonate.

5. The cell according to claim 3, in which said saturated cyclic carbonate is propylene carbonate.

6. The cell according to claim 3, in which said saturated cyclic carbonate is a mixture of ethylene carbonate and of propylene carbonate.

7. The cell according to claim 1, in which said linear ester is selected from the group consisting of an acetate, a butyrate, a propionate, and a mixture thereof.

8. The cell according to claim 7, in which said linear ester in ethyl acetate.

9. The cell according to claim 7, in which said linear ester is methyl butyrate.

10. The cell according to claim 1, in which said unsaturated cyclic carbonate is selected from the group consisting of vinylene carbonate, propylidene carbonate, ethylene ethylidence carbonate and ethylene isopropylidene carbonate.

11. The cell according to claim 1, in which said unsaturated cyclic carbonate is vinylene carbonate.

12. The cell according to claim 1, in which said binder contains an elastomer.

13. The cell according to claim 12, in which said elastomer is selected form the group consisting of: (A) acrylonitrile and butadiene copolymer and (B) styrene and butadiene copolymer.

14. The cell according to claim 12, in which said elastomer is in the range 30% to 70% by weight of said binder.

15. The cell according to claim 1, in which said binder contains a cellulose compound.

16. The cell according to claim 15, in which said cellulose compound is a carboxymethyl cellulose of mean molecular weight greater than about 200,000.

17. The cell according to claim 15, in which said cellulose compound is in the range 30% to 70% by weight of said binder.

18. The cell according to claim 1, in which said binder is made up of a mixture of an elastomer and a cellulose compound.

19. The cell according to claim 18, in which said binder is made up of a mixture of an acrylonitrile and butadiene copolymer and carboxymethyl cellulose having a mean molecular weight greater than about 200,000.

20. The cell according to claim 18, in which said binder is made up of a mixture of styrene and butadiene copolymer and carboxymethyl cellulose having a mean molecular weight greater than about 200,000.

21. The cell according to claim 18, in which said elastomer is in the range 30% to 70% by weight of said binder and said cellulose compound is in the range 30% to 70% by weight of said binder.

22. The cell according to claim 21, in which said elastomer is in the range 50% to 70% by weight of said binder and said cellulose compound is in the range 30% to 50% by weight of said binder.

23. The cell according to claim 1, in which said binder contains an acrylic polymer.

24. The cell according to claim 23, in which said polymer is an acrylic and homopolymer.

25. The cell according to claim 23, in which said acrylic polymer is in the range 20% to 60% by weight of said binder.

26. The cell according to claim 1, in which said binder is made up of a mixture of an elastomer and of an acrylic polymer.

27. The cell according to claim 26, in which said binder is made up of a mixture of an acrylonitrile and butadiene copolymer and an acrylic homopolymer.

28. The cell according to claim 26, in which said binder is made up of a mixture of styrene and butadiene copolymer and an acrylic acid homopolyer.

29. The cell according to claim 26, in which said elastomer is in the range 40% to 80% by weight of said binder and said acrylic polymer is in the range 20% to 60% by weight of said binder.

30. The cell according to claim 1, wherein the cell is useable at temperatures less than or equal to −20° C.

31. The cell of claim 1, comprsing a mixed solvent system of ethylene carbonate/ propylene carbonate/ methyl butyrate/vinylene carbonate.

32. A rechargeable lithium electrochemical cell comprising an electrolyte containing a lithium salt dissolved in a non-aqueous solvent, wherein the solvent is essentially constituted of (A) at least one linear ester of a saturated aliphatic monocarboxylic acid and (B) at least two cyclic carbonates, one of which is a saturated cyclic carbonate and one of which is an unsaturated cyclic carbonate, and (C) a saturated linear carbonate, at least one positive electrode, at least one negative pasted electrode containng a carbon compound electrochemically active material suitable for inserting lithium ions and a polymer binder containing no fluorine;

wherein said linear ester is not less that 50% by volume of said solvent.

33. The cell according to claim 32, in which said saturated linear carbonate is selected from the group consisting of dimethyl carbonate, diethyl carbonate, ethyl methyl carbonate, propyl methyl carbonate, and mixtures thereof.

34. The cell according to claim 32, in which said saturated linear carbonate is dimethyl carbonate.

35. The cell according to claim 32, in which the volume proportion of said saturated linear carbonate is no more than 40% of said solvent.

36. The cell of claim 32, comprising a mixed solvent system of ethylene carbonate/dimethyl carbonate/ethyl acetate/vinylene carbonate.

* * * * *